United States Patent
Yuan et al.

(10) Patent No.: US 9,423,621 B2
(45) Date of Patent: Aug. 23, 2016

(54) PRISM BEAM EXPANSION SYSTEM

(71) Applicant: Shanghai Institute of Optics And Fine Mechanics, Chinese Academy of Sciences, Shanghai (CN)

(72) Inventors: Zhijun Yuan, Shanghai (CN); Haibo Zhang, Shanghai (CN); Jun Zhou, Shanghai (CN); Liming Geng, Shanghai (CN); Liyuan Jiang, Shanghai (CN); Yunrong Wei, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 14/954,580

(22) Filed: Nov. 30, 2015

(65) Prior Publication Data

US 2016/0178914 A1 Jun. 23, 2016

(30) Foreign Application Priority Data

Dec. 19, 2014 (CN) .......................... 2014 1 0806115

(51) Int. Cl.
*G02B 5/04* (2006.01)
*G02B 27/09* (2006.01)

(52) U.S. Cl.
CPC ........... *G02B 27/0972* (2013.01); *G02B 5/045* (2013.01)

(58) Field of Classification Search
CPC ............ H01S 3/13; H01S 3/091; H01S 3/08; G02F 1/09; G02B 27/10; G02B 27/283; G02B 5/04; G02B 5/045; G02B 7/18
USPC ................ 359/831–837, 619, 625, 627, 628; 372/98, 100, 102, 75
See application file for complete search history.

(56) References Cited

U.S. PATENT DOCUMENTS

2002/0075932 A1* 6/2002 Stamm ................ H01S 3/08004
372/57

* cited by examiner

*Primary Examiner* — Euncha Cherry
(74) *Attorney, Agent, or Firm* — Mei & Mark LLP; Manni Li

(57) ABSTRACT

Prism beam expansion system which having two or more right angle prisms with the same structure. The incident light beam enters via an incident inclined plane and exits as an exit light beam that is perpendicular to an exit right angle plane of the same right angle prism. The vertex angle α of all the right angle prisms are the same and satisfies the expression $$\alpha = \arcsin\left(\frac{n1}{n2} \times \sin\theta 1\right),$$

where n1 and n2 represent the refractive indexes of the laser beam respectively in the incident media and in the right angle prism.

6 Claims, 3 Drawing Sheets

PRISM BEAM EXPANSION SYSTEM

CROSS-REFERENCE AND RELATED APPLICATION

The subject application claims priority on Chinese patent application CN 201410806115.X filed on Dec. 19, 2014. The contents and subject matters of the priority application are incorporated herein by reference.

FIELD OF THE INVENTION

The present invention relates to expansion of parallel light beams, particularly, a prism beam expansion system for the expansion of parallel light beams, such as in a linewidth narrowing module of an excimer laser or a dye laser.

BACKGROUND OF THE INVENTION

The narrow width excimer laser for lithography generally employs a combination of a prism beam expansion system with an echelle grating for linewidth narrowing. The role of the prism beam expansion system is to expand laser light in the horizontal direction. As the linewidth of a lithography machine is inversely proportional to the expansion factor, a technician strives for an expansion factor as large as possible via combination of prisms. In the current technology, for examples, see U.S. Pat. No. 5,978,409 and Chinese Patent CN101581866B, three to four prisms are employed for realizing an expansion factor of 20-30 times. The sizes of the prisms successively grow with the expansion and transmission of the light beam, with the size of the big prism at the end of the expansion system being generally over 100 mm. In the technical field, material for the prism is generally selected from an ultraviolet fusedsilica or calcium fluoride with high transmittance. As optical materials in large size are difficult to fabricate and limited in production quantity, they are expensive. Further, the current technology employs right angle prisms of different specifications and requires different tools or clamps during polishing, and hence, the processing cycle is long and cost is high.

SUMMARY OF THE INVENTION

To overcome the dependence on large size prisms and high cost in the current technology, the present invention provides a prism beam expansion system employing a combination of low cost and small size right angle prisms to obtain a large expansion factor.

The prism beam expansion system of the present invention comprises more than 2 right angle prisms with the same structure and placed consecutively in alignment. The incident light beam in an incident medium enters through an inclined plane of the right angle prism, termed as incident inclined plane, and exits as an exit light beam that is perpendicular to a right angle plane of the same prism, termed as exit right angle plane. The vertex angle $\alpha$ of each prism are equal and satisfies the following expression:

$$\alpha = \arcsin\left(\frac{n1}{n2} \times \sin\theta 1\right)$$

where n1 and n2 respectively represent the refractive indexes of the laser beam in the incident medium and in the right angle prisms.

In the prism beam expansion system of the present invention, the right angle prisms are grouped with the incident inclined planes of the prisms in each group being serially connected along a line.

In the prism beam expansion system of the present invention, the incident inclined plane and the exit right angle plane are polished, while the other right angle plane is not polished.

In the prism beam expansion system of the present invention, the incident inclined plane and the exit right angle plane are coated with an antireflection coating against a wavelength of the incident laser beam.

In the prism beam expansion system of the present invention, the transmittance of the right angle prism is greater than 50%.

In the prism beam expansion system of the present invention, the right angle prism may be a right angle trapezoidal prism.

The prism beam expansion system of the present invention is mostly employed for the expansion of parallel light beams, such as in a linewidth compression module of a excimer laser or a dye laser. It is advantageous in that the laser beam may arrive at any expansion factor of any number via increasing the number of the right angle prisms, without being restricted by the size of the prism material. The prism beam expansion system of the present invention is further advantageous in that it consumes less material and has a low cost. Moreover, right angle prisms with the same specification are suitable for mass production, which will lead to substantive reduction in processing cycles and cost.

Reference numbers and designations used in the figures are as follows:

r1 represents an incident light beam; r2 represents an exit light beam; i1 represents an inclined plane of the right angle prism; i2 and i3 each represents a right angle plane of the right angle prism; P1 represents the first group; P2 represents the second group; P3 represents the third group; P4 represents the fourth group; E1 represents the first right angle trapezoidal prism; and E2 represents the second right angle trapezoidal prism.

DETAILED DESCRIPTION OF THE INVENTION AND EMBODIMENTS

Figure 1:
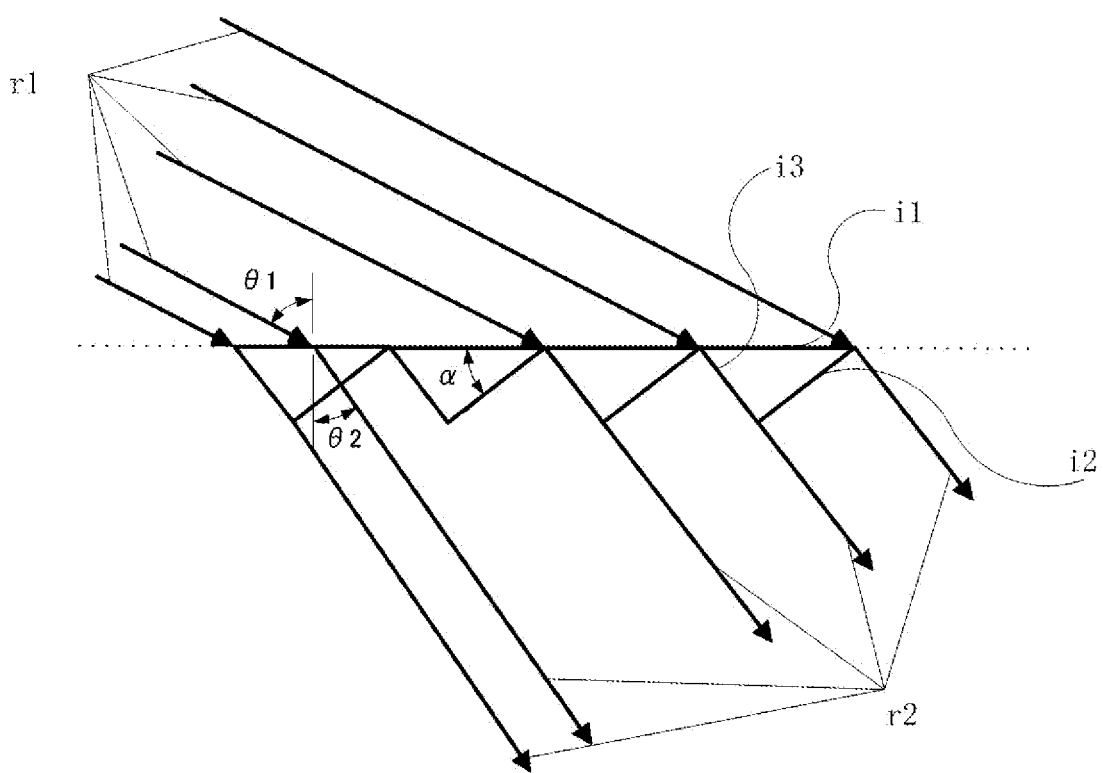
FIG. 1 is a schematic diagram showing a first embodiment of the prism beam expansion system of the present invention.

First, the vertex angle $\alpha$ of the right angle prisms of the prism beam expansion system of the present invention must be determined as follows. For the light beam to exit perpendicularly to the right angle plane of the prism, the vertex angle of the prism may be calculated via calculation of the incident angle of the light beam. Referring to FIG. 1, according to the Law of Refraction of Light:

$$n1 \times \sin\theta 1 = n2 \times \sin\theta 2 \qquad (1)$$

wherein $\theta 1$, $\theta 2$ are respectively the incident angle and the refraction angle, n1, n2 are constants, and represent the refractive indexes of the laser light in respect of air and the prism respectively. In the case of perpendicular exit, the refraction angle and the vertex angle α of the prism are the same.

$$\theta 2 = \alpha \quad (2)$$

Hence the vertex angle of the prism is calculated via the following expression:

$$\alpha = \arcsin\left(\frac{n1}{n2} \times \sin\theta 1\right) \quad (3)$$

The expansion factor of an individual prism is thus:

$$M = \frac{\cos\theta 2}{\cos\theta 1} = \frac{\cos\alpha}{\cos\theta 1} \quad (4)$$

Next, the working principle of the prism beam expansion system of the present invention is as follows. As shown in FIG. 1 which is the first embodiment of the present invention, the prism beam expansion system of the present invention has 4 right angle prisms with the same specification. All the prisms are serially connected and lined up in a line along the X direction. The incident light beam r1 enters via the inclined plane i1 of the right angle prism, while the exit light beam r2 is perpendicular to the right angle plane i2. The vertex angle α of each right angle prism equals one another, the incident angle θ1 equals one another, and the refraction angle θ2 equals one another.

In the first embodiment, ultra violetsilica fused silica is adopted as the material for the right angle prism (n2=1.56, n1=1.00), the incident angle θ1 being 72 degrees. According to the expressions (3) and (4), the vertex angle α is 37.56 degrees, and the expansion factor can reach 2.565. The specification of the right angle prism is:

$$A=50.00 \text{ mm}, B=39.64 \text{ mm}, C=30.48 \text{ mm, and } H=30 \text{ mm} \quad (5)$$

wherein A, B, and C are the lengths of the hypotenuse and the two right angle sides of the right angle prism, and H is the thickness of the right angle prism. FIG. 1 shows that the prism beam expansion system is capable of realizing expansion of a light beam.

Further, the reason of reduced cost of the present invention is as follows. In the first embodiment, 4 right angle prisms of absolutely identical structure are employed. With $V_i$ denoting the volume of the right angle prism, the net volume of the ultra violet fused silica required by the prism beam expansion system is:

$$Va = (V_i) \times 4 = \left(\frac{B \times C}{2} \times H\right) \times 4 \quad (6)$$

In comparison, for example in U.S. Pat. No. 5,978,409, the same expansion factor is realized via a large right angle prism. The net volume required of the ultra violet fused silica is:

$$Vb = \frac{(4 \times B) \times (4 \times C)}{2} \times H \quad (7)$$

The ration of the two volumes is:

$$\eta = \frac{Va}{Vb} = 1/4 \quad (8)$$

Thus, to obtain the same expansion factor, the present invention consumes just ¼ of the material of the prior art, thus substantially reducing the cost of material for the beam expander. The greater the expansion factor, the more obvious the cost benefit of the present invention. Moreover, the prior art employs right angle prisms of different specification, which invariably requires different clamping tools, while in the present embodiment, multiple small size right angle prisms of the same specification are used to substantially reduce the processing cycle and the cost.

Figure 2:
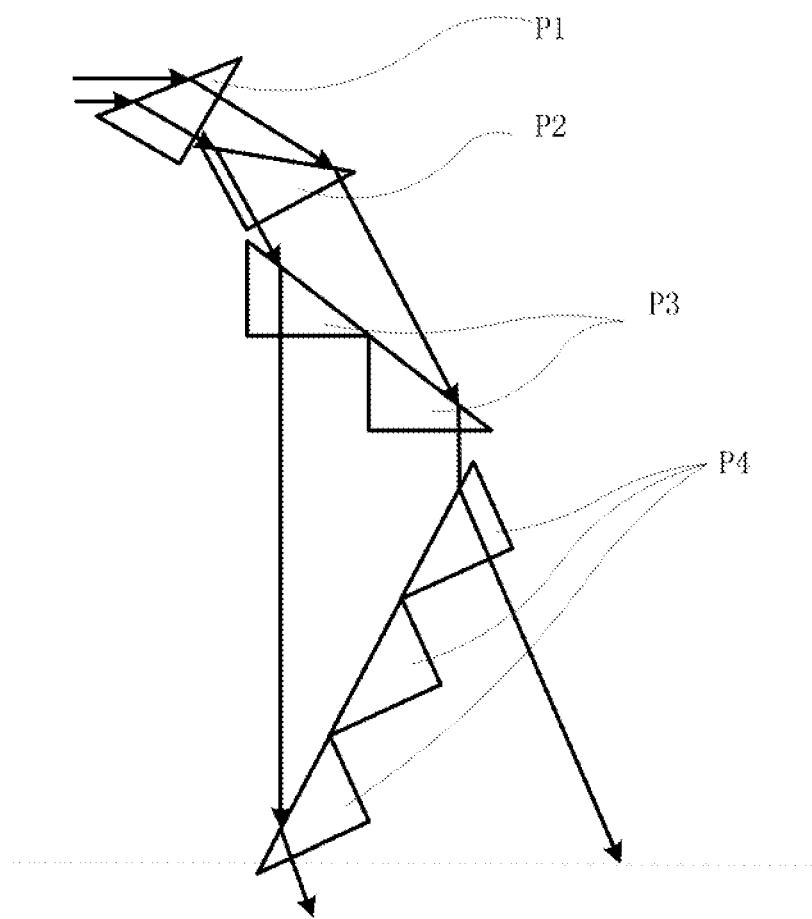
FIG. 2 is a schematic diagram showing a second embodiment of the prism beam expansion system of the present invention.

In the second embodiment of the present invention, a laser light expansion of an expansion factor of 43 is enunciated. As shown in FIG. 2, seven (7) identical right angle prisms are employed for laser light expansion. The size of the vertex angles, the three lengths and the height of each right angle prism are the same as listed in expression (5). They are divided into 4 groups: the first group P1 comprises one right angle prism, the second group P2 comprises one right angle prism, the third group P3 comprises two right angle prisms, and the fourth group P4 comprises three right angle prisms.

The incident angles for the four groups are the same, 72 degrees. As stated previously, the expansion factor realized by an individual right angle prism is $M_i$=2.565 times, and then the total expansion factor for all the four groups is $M=(M_i)^4=(2.565)^4$=43.29 times.

To design an expansion system with a larger expansion factor, it only needs to increase the number of prisms in each group in the present invention. The sub systems on the backend of the expansion system are not restricted by the size of the material of the prisms. To realize an expansion factor of any number, all is needed is to add an aperture of a specific diameter at the location of the incident light beam or the exit light beam in the present invention.

Figure 3:
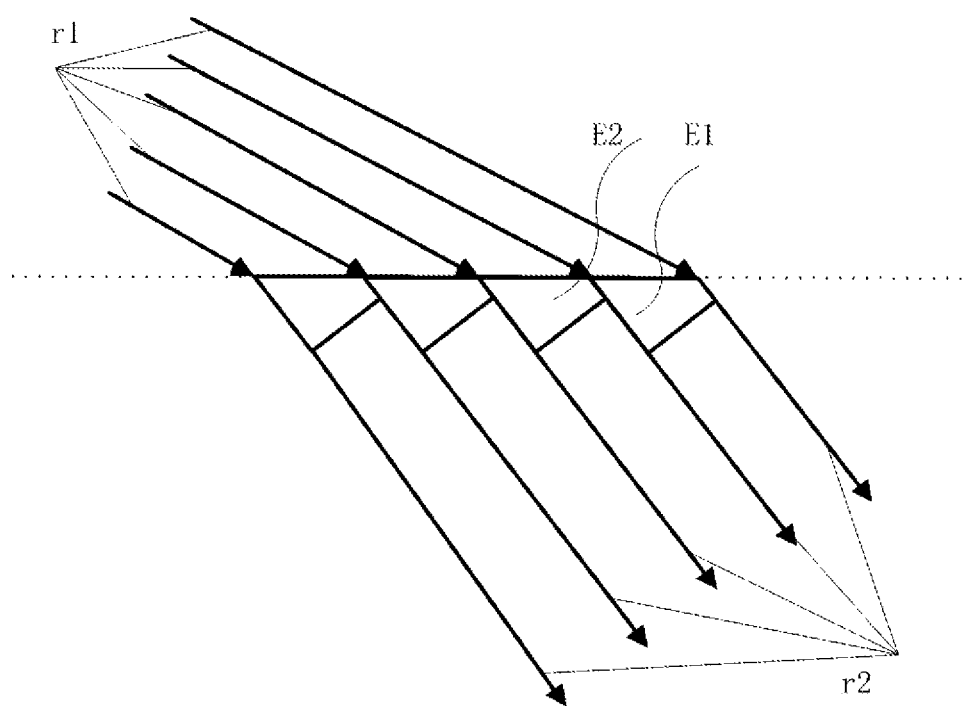
FIG. 3 is a schematic diagram showing a third embodiment of the prism beam expansion system of the present invention for a trapezoidal prism beam expansion system.

In the third embodiment of the present invention, referring to FIG. 3, four (4) right angle trapezoidal prisms of the identical structure are employed for optical light beam expansion. The right angle trapezoidal prism is obtained from the right angle prism on FIG. 1 viacutting away the vertex along the exit light beam r2. All the right angle trapezoidal prisms are serially connected and lined up along a same direction. It is advantageous in that the adjacent surfaces of adjacent right angle trapezoidal prisms, such as the bottom surface of the first right angle trapezoidal prism E1 and the upper surface of the second right angle trapezoidal prism E2, may be glued up together, so as to enable the expansion system to have better stability.

Modification of the present invention and the designing method for the right angle prism is possible to give rise to an optical expansion system not restricted to right angle prisms, which is within the scope of the present invention.

We claim:
1. A prism beam expansion system comprising
two or more right angle prisms consecutively placed in alignment, each of the right angle prisms having an incident inclined plate (i1), an exit right angle plane (i2), and a vertex angle α, and the incident plate (i1), the exit right angle plane (i2), and the vertex angle α of all right angle prisms having the same structure,
wherein an incident light beam (r1) in an incident media enters through the inclined plane (i1) of the first right angle and exits as an exit light beam (r2) that is perpendicular to the right angle plane (i2) of the same right angle prism, the vertex angle α satisfies an expression:

$$\alpha = \arcsin\left(\frac{n1}{n2} \times \sin\theta1\right),$$

n1 and n2 respectively represent refractive indexes of the light beam in the incident media and in the right angle prism.

2. The prism beam expansion system of claim 1, wherein the right angle prisms are grouped with the incident inclined planes of the prisms in each group being serially connected along a line.

3. The prism beam expansion system of claim 1, wherein the incident inclined plane and the exit right angle plane of the right angle prisms are polished, and the other right angle plane of the right angle prisms is not polished.

4. The prism beam expansion system of claim 1, wherein the incident inclined plane and the exit right angle plane are coated with an antireflection coating against a wavelength of the incident light beam.

5. The prism beam expansion system of claim 1, wherein a transmittance of the right angle prism is greater than 50%.

6. The prism beam expansion system of claim 1, wherein the right angle prism is a right angle trapezoidal prism in the prism beam expansion system.

\* \* \* \* \*